United States Patent
Chen et al.

(10) Patent No.: US 11,488,578 B2
(45) Date of Patent: Nov. 1, 2022

(54) METHOD AND APPARATUS FOR TRAINING SPEECH SPECTRUM GENERATION MODEL, AND ELECTRONIC DEVICE

(71) Applicant: Beijing Baidu Netcom Science and Technology Co., Ltd., Beijing (CN)

(72) Inventors: Zhijie Chen, Beijing (CN); Tao Sun, Beijing (CN); Lei Jia, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/205,121

(22) Filed: Mar. 18, 2021

(65) Prior Publication Data
US 2021/0201887 A1    Jul. 1, 2021

(30) Foreign Application Priority Data

Aug. 24, 2020 (CN) .......................... 202010858104.1

(51) Int. Cl.
*G10L 13/00* (2006.01)
*G10L 13/047* (2013.01)
(Continued)

(52) U.S. Cl.
CPC ............ *G10L 13/047* (2013.01); *G10L 25/18* (2013.01); *G10L 25/30* (2013.01)

(58) Field of Classification Search
CPC ........ G10L 13/00; G10L 13/047; G10L 13/10
See application file for complete search history.

(56) References Cited

U.S. PATENT DOCUMENTS 10,388,272 B1    8/2019 Thomson et al.
10,713,821 B1    7/2020 Surya et al.
(Continued)

FOREIGN PATENT DOCUMENTS

CN    108597496 A    9/2018
CN    108630190 A    10/2018
(Continued)

OTHER PUBLICATIONS

Extended European Search Report corresponding to European Patent Application No. 21163034.8, dated Sep. 28, 2021 (7 pages).
(Continued)

*Primary Examiner* — Shreyans A Patel
(74) *Attorney, Agent, or Firm* — Maginot, Moore & Beck LLP

(57) ABSTRACT

The present application discloses a method and an apparatus for training a speech spectrum generation model, as well as an electronic device, and relates to the technical field of speech synthesis and deep learning. A specific implementation is as follows: inputting a first text sequence into the speech spectrum generation model to generate an analog spectrum sequence corresponding to the first text sequence, and obtain a first loss value of the analog spectrum sequence according to a preset loss function; inputting the analog spectrum sequence corresponding to the first text sequence into an adversarial loss function model, which is a generative adversarial network model, to obtain a second loss value of the analog spectrum sequence; and training the speech spectrum generation model based on the first loss value and the second loss value.

20 Claims, 5 Drawing Sheets inputting a first text sequence into the speech spectrum generation model to generate an analog spectrum sequence corresponding to the first text sequence, and obtain a first loss value of the analog spectrum sequence according to a preset loss function — S101 inputting the analog spectrum sequence corresponding to the first text sequence into an adversarial loss function model to obtain a second loss value — S102 training the speech spectrum generation model based on the first loss value and the second loss value — S103

(51) Int. Cl.
  *G10L 13/10* (2013.01)
  *G10L 25/18* (2013.01)
  *G10L 25/30* (2013.01)

(56) References Cited

U.S. PATENT DOCUMENTS

| | | | |
|---|---|---|---|
| 11,222,621 B2* | 1/2022 | Battenberg | G10L 13/10 |
| 2012/0065961 A1 | 3/2012 | Latorre et al. | |
| 2019/0355344 A1 | 11/2019 | Kang et al. | |
| 2019/0355347 A1 | 11/2019 | Arik et al. | |
| 2020/0125975 A1 | 4/2020 | Pezeshkpour et al. | |
| 2020/0285938 A1 | 9/2020 | Kim et al. | |
| 2020/0294486 A1 | 9/2020 | Daido et al. | |
| 2021/0192357 A1* | 6/2021 | Sinha | G06N 3/0454 |
| 2021/0281349 A1* | 9/2021 | Kojima | H04J 14/0278 |
| 2021/0350786 A1* | 11/2021 | Chen | G10L 13/00 |
| 2022/0005457 A1* | 1/2022 | Balakrishnan | G10L 13/047 |

FOREIGN PATENT DOCUMENTS

| | | |
|---|---|---|
| CN | 109147810 A | 1/2019 |
| CN | 110390950 A | 10/2019 |
| CN | 110503128 A | 11/2019 |
| CN | 110600013 A | 12/2019 |
| CN | 110739002 A | 1/2020 |
| CN | 110930976 A | 3/2020 |
| CN | 111128137 A | 5/2020 |
| CN | 111243572 A | 6/2020 |
| CN | 111316352 A | 6/2020 |
| CN | 111444731 A | 7/2020 |
| CN | 111462768 A | 7/2020 |
| CN | 112489621 A | 3/2021 |
| JP | 2010237323 A | 10/2010 |
| JP | 2018146821 A | 9/2018 |
| WO | 2010116549 A1 | 10/2010 |
| WO | 2017210095 A2 | 12/2017 |
| WO | 2019050247 A2 | 3/2019 |
| WO | 2019107379 A1 | 6/2019 |

OTHER PUBLICATIONS

Saito, Yuki, Shinnosuke Takamichi, and Hiroshi Saruwatari. "Vocoder-free text-to-speech synthesis incorporating generative adversarial networks using low-/multi-frequency STFT amplitude spectra." Computer Speech & Language 58 (2019): 347-363.

Yamamoto, Ryuichi, Eunwoo Song, and Jae-Min Kim. "Parallel WaveGAN: A fast waveform generation model based on generative adversarial networks with multi-resolution spectrogram." ICASSP 2020-2020 IEEE International Conference on Acoustics, Speech and Signal Processing (ICASSP). IEEE, 2020.

Su, Jiaqi, Zeyu Jin, and Adam Finkelstein. "HiFi-GAN: High-fidelity denoising and dereverberation based on speech deep features in adversarial networks." arXiv preprint arXiv:2006.05694 (2020).

Chinese Office Action corresponding to Chinese Patent Application No. 202010858104.1, dated Mar. 17, 2021 (14 pages).

Waveform Generation for Text-To-Speech Synthesis Using Pitch-Synchronous Multi-Scale Generative Adversarial Networks. Lauri Juvela, et al. Oct. 30, 2018. (5 pages) arXiv:1810.12598v1.

Wasserstein GAN and Waveform Loss-based Acoustic Model Training for Multi-speaker Text-to-Speech Synthesis Systems Using a WaveNet Vocoder. Yi Zhao, et al. Jul. 31, 2018. arXiv:1807.11679v1.

A Spectrally Weighted Mixture of Least Square Error and Wasserstein Discriminator Loss for Generative SPSS. Gilles Degottex, et al. https://gitlab.com/gillesdegottex/percivaltts.

Text-to-Speech Synthesis Using STFT Spectra Based on Low-/Multi-Resolution Generative Adversarial Networks. Yuki Saito, et al. 2018. (5 pages).

Chinese Office Action corresponding to Chinese Patent Application No. 202010858104.1, dated Aug. 27, 2021 (11 pages).

Japanese Office Action corresponding to Japanese Patent Application No. 2021-048816, dated Apr. 21, 2022 (2 pages).

Machine Translation of Japanese Office Action corresponding to Japanese Patent Application No. 2021-048816, dated Apr. 21, 2022 (2 pages).

Machine Translation of JP2018146821A. (23 Pages).

* cited by examiner

METHOD AND APPARATUS FOR TRAINING SPEECH SPECTRUM GENERATION MODEL, AND ELECTRONIC DEVICE

CROSS-REFERENCE TO RELATED APPLICATION

This application claims priority to Chinese Patent Application No. 202010858104.1 filed on Aug. 24, 2020, the disclosure of which is incorporated in its entirety by reference herein.

TECHNICAL FIELD

The present disclosure relates to the technical field of data processing, in particular of speech synthesis and deep learning, and specifically to a method and an apparatus for training a speech spectrum generation model and a corresponding electronic device.

BACKGROUND

Spectrum generation technique is a very important technique in speech synthesis, in which a spectrum acts as a bridge to connect an input text sequence with a finally synthesized audio.

In related art, the speech spectrum generation model uses a mean square error (MSE) loss function to feed back an error of the generated spectrum, but modeling based on the MSE loss function cannot reflect the nature of the spectrum, and may result in a very fuzzy spectrum. If a vocoder is trained with a real clear spectrum, inputting the fuzzy spectrum into the vocoder will lead to inconsistency between the training and judgment of the vocoder, which will seriously affect the stability of the vocoder and thus the tone quality of the finally synthesized audio.

SUMMARY

The present disclosure provides a method and an apparatus for training a speech spectrum generation model, a device and a storage medium.

According to an aspect of the present disclosure, there is provided a method for training a speech spectrum generation model, including inputting a first text sequence into the speech spectrum generation model to generate an analog spectrum sequence corresponding to the first text sequence, and to obtain a first loss value of the analog spectrum sequence according to a preset loss function. The method also includes inputting the analog spectrum sequence corresponding to the first text sequence into an adversarial loss function model, which is a generative adversarial network model, to obtain a second loss value of the analog spectrum sequence. The method also includes training the speech spectrum generation model based on the first loss value and the second loss value.

According to another aspect of the present disclosure, there is provided an apparatus for training a speech spectrum generation model, including first and second obtaining modules, and a first training module. The first obtaining module is configured to input a first text sequence into the speech spectrum generation model to generate an analog spectrum sequence corresponding to the first text sequence, and to obtain a first loss value of the analog spectrum sequence according to a preset loss function. The second obtaining module is configured to input the analog spectrum sequence corresponding to the first text sequence into an adversarial loss function model, which is a generative adversarial network model, to obtain a second loss value of the analog spectrum sequence. The first training module, configured to train the speech spectrum generation model based on the first loss value and the second loss value.

It should be understood that the content described in this section is not intended to identify key or important features of the embodiments of the present disclosure, nor is it intended to limit the scope of the present disclosure. Other features of the present disclosure will be easily understood from the following description.

BRIEF DESCRIPTION OF THE DRAWINGS

The accompanying drawings are provided for better understanding the solution, and do not constitute a limitation on the present application. In the drawings.

DETAILED DESCRIPTION

Exemplary embodiments of the present application are described hereinafter in conjunction with the accompanying drawings, wherein various details of the embodiments of the present application are included to assist in the understanding, but they should be regarded as exemplary only. Therefore, those having ordinary skills in the art should realize that various changes and modifications can be made to the embodiments described herein without departing from the scope and spirit of the present application. In addition, descriptions of well-known functions and constructions are omitted for clarity and conciseness.

Spectrum generation technique, as a very important part of speech synthesis technique, realizes the conversion from a text sequence to a spectrum sequence which is used as a bridge to connect the input text sequence with the finally synthesized audio.

The spectrum generation technique in the related art usually uses a Tacotron model, in which a text sequence is used as an input and a spectrum sequence as an output, and which realizes end-to-end speech synthesis modeling based on Attention technique and uses an MSE function as a loss function. However, the MSE loss function calculates a loss value through a point-by-point comparison. Due to the multimode of the generated spectrum sequence, the above-mentioned calculation method cannot characterize a spectrum sequence in essence, and thus cannot accurately reflect the authenticity of the spectrum. As a result, a relatively fuzzy spectrum sequence which differs greatly from the real spectrum sequence is generated by the Tacotron model, which results in poor tone quality of the finally synthesized audio.

If there is a loss function that can essentially reflect characteristics of the spectrum sequence and thus makes it possible to accurately determine the authenticity of the spectrum sequence, training the spectrum generation model with such a loss function can generate a more realistic and clear spectrum sequence.

The present application is based on a universal approximation theorem for neural networks, which makes approximations by characterizing an expected loss function using a neural network model and trains it based on generative adversarial networks, so that the neural network model can accurately determine the authenticity of the spectrum sequence, and then feed it back to a spectrum generation model, so as to makes the spectrum sequence generated by the speech spectrum generation model closer to a real distribution.

Specifically, according to an embodiment of the present application, the present application provides a method for training a speech spectrum generation model.

Figure 1:
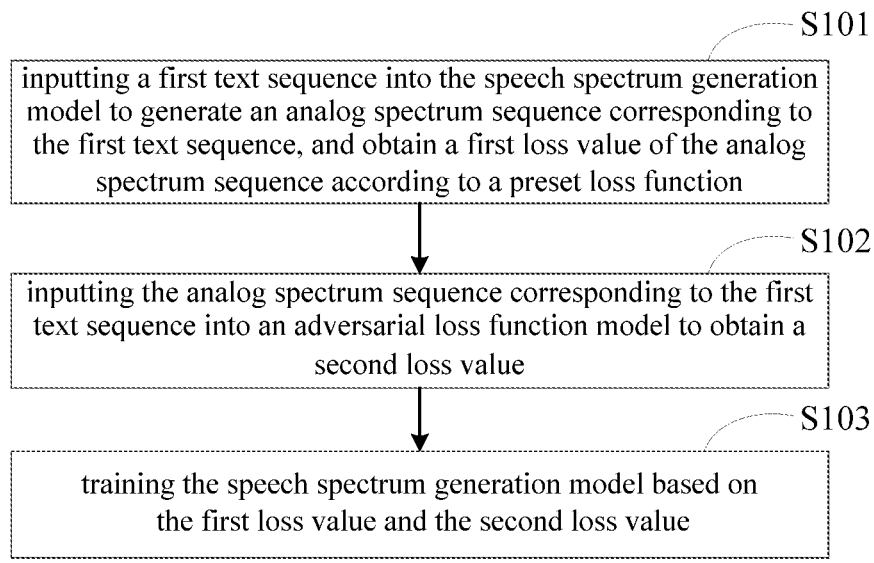
FIG. 1 is a schematic flowchart of a method for training a speech spectrum generation model according to a first embodiment of the present application.

Referring to FIG. 1, which is a flowchart of a method for training a speech spectrum generation model provided by an embodiment of the present application, the method includes the following steps S101 to S103.

In step S101, a first text sequence is input into a speech spectrum generation model to generate an analog spectrum sequence corresponding to the first text sequence, and obtain a first loss value of the analog spectrum sequence according to a preset loss function.

In this step, the first text sequence, as a training sample of the speech spectrum generation model, can be a single text sequence or a collection of multiple text sequences. In this way, a gap between a spectrum sequence generated by the current speech spectrum generation model and a real spectrum can be accurately reflected by means of a large number of training samples, and the real spectrum sequence corresponding to the first text sequence can be directly obtained from a sound bank.

The speech spectrum generation model can be a Tacotron model, or another Text To Speech (TTS) model. For convenience of description and understanding, the Tacotron model is used as an example to illustrate the embodiments of the present application, and does not constitute any particular limitation.

The preset loss function may be an MSE loss function, and a loss value of the MSE loss function may represent an expected value of the square of a difference between the spectrum sequence generated by the Tacotron model and the real spectrum sequence, and may be responsible for training intelligibility of the spectrum sequence generated by the speech spectrum generation model; of course, the preset loss function may be another loss function. For convenience of description and understanding, the MSE loss function is taken as an example to illustrate the embodiments of the present application, and does not constitute any particular limitation.

Figure 2:
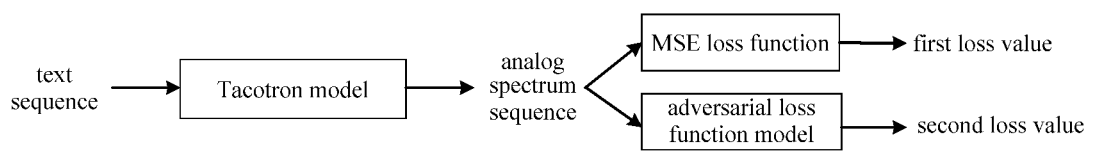
FIG. 2 is a schematic diagram showing the principle of generating a spectrum sequence by the speech spectrum generation model according to the first embodiment of the present application.

In this step, as shown in FIG. 2, the text sequence is input into the Tacotron model. At an early stage of the training, the Tacotron model can generate an analog spectrum sequence corresponding to the text sequence, which is different from the real spectrum sequence corresponding to the text sequence, based on random initialization parameters. According to the MSE loss function, a first loss value corresponding to the analog spectrum sequence, which can represent a loss of the intelligibility of the analog spectrum sequence relative to the real spectrum sequence, can be calculated.

In step S102, the analog spectrum sequence corresponding to the first text sequence is input into an adversarial loss function model, which is a generative confrontational network model, to obtain a second loss value of the analog spectrum sequence.

According to a universal approximation theorem for neural networks, the adversarial loss function model can approximate a loss function, and it is, in essence, a deep learning model for generative adversarial networks, and can be trained based on an adversarial learning method to characterize a loss function. The loss function can characterize the characteristics of the spectrum sequence in essence, and can be responsible for training the clarity of the spectrum sequence generated by the speech spectrum generation model.

In this step, as shown in FIG. 2, the analog spectrum sequence generated in step S101 is input into the adversarial loss function model so that a second loss value can be output. The second loss value represents a loss in the clarity of the analog spectrum sequence relative to the real spectrum sequence.

In step S103, the speech spectrum generation model is trained based on the first loss value and the second loss value.

It can be seen from the above that the preset loss function, taking the MSE loss function as an example, can be responsible for training the intelligibility of the spectrum sequence generated by the speech spectrum generation model, and the adversarial loss function model can be responsible for training the clarity of the spectrum sequence generated by the speech spectrum generation model. In this step, the first loss value and the second loss value may be fed back to the speech spectrum generation model according to a preset ratio, so that the speech spectrum generation model can learn by itself based on the loss values to optimize the parameters.

In this step, the preset ratio can be determined depending on characteristics of speakers in different sound banks, and is not particularly limited in the present application. Feeding the first loss value and the second loss value back to the speech spectrum generation model according to the preset ratio can be understood as feeding the first loss value and the second loss value back to the speech spectrum generation model according to their weights of the preset ratio.

In this way, the above two loss functions are combined and fed back to the speech spectrum generation model together, so that the parameters of the speech spectrum generation model can be further optimized as compared with training it with the preset loss function alone, and the spectrum sequence generated by the trained speech spectrum generation model has further improved clarity while having ensured intelligibility.

The above-mentioned embodiment of the present application has the following advantages or beneficial effects: by inputting the first text sequence into the speech spectrum generation model to generate the analog spectrum sequence corresponding to the first text sequence and obtain the first loss value of the analog spectrum sequence according to the preset loss function, inputting the analog spectrum sequence corresponding to the first text sequence into the adversarial loss function model to obtain the second loss value of the analog spectrum sequence, and training the speech spectrum generation model based on the first loss value and the second loss value, the adversarial loss function model learns a loss function based on generative adversarial networks, and trains the speech spectrum generation model jointly with the preset loss function, which can make the spectrum sequence generated by the speech spectrum generation model clearer, thereby improving the stability in subsequent audio conversion and the tone quality of the finally synthesized audio.

Figure 3:
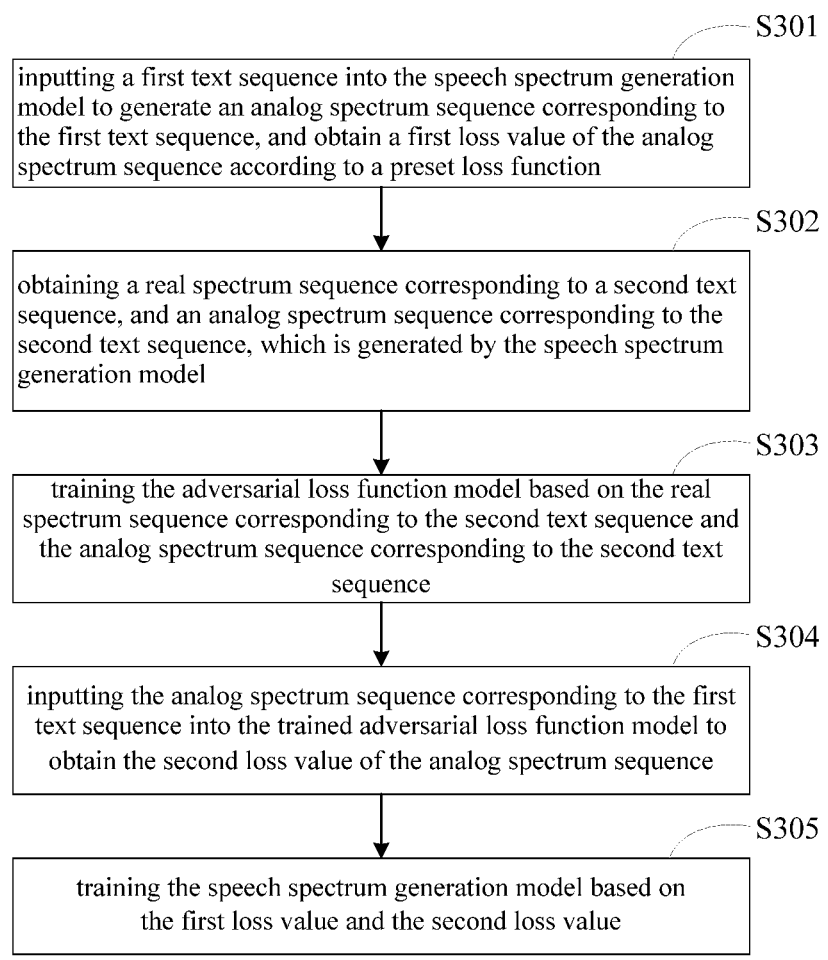
FIG. 3 is a schematic flowchart of a method for training a speech spectrum generation model according to a second embodiment of the present application.

Referring to FIG. 3, which is a flowchart of another method for training a speech spectrum generation model provided by an embodiment of the present application, the method includes the following steps S301 to S305.

In step S301, a first text sequence is input into a speech spectrum generation model to generate an analog spectrum sequence corresponding to the first text sequence, and obtain a first loss value of the analog spectrum sequence according to a preset loss function.

Reference can be made to the specific description of S101 in the embodiment shown in FIG. 1 for a specific implementation of this step S301, which will not be described in detail here in order to avoid repetition.

In step S302, a real spectrum sequence corresponding to a second text sequence and an analog spectrum sequence corresponding to the second text sequence are obtained, wherein the analog spectrum sequence corresponding to the second text sequence is generated by the speech spectrum generation model.

In this step, the second text sequence may be a single text sequence or a collection of multiple text sequences. In addition, the second text sequence may be a collection of text sequences that are exactly the same as the first text sequence, or that are partially identical to the first text sequence, or that are completely different from the first text sequence, and it is not particularly defined in the present application.

The real spectrum sequence corresponding to the second text sequence can be obtained directly from a sound bank, and the analog spectrum sequence corresponding to the second text sequence is generated by the speech spectrum generation model.

In step S303, the adversarial loss function model is trained based on the real spectrum sequence corresponding to the second text sequence and the analog spectrum sequence corresponding to the second text sequence.

In this step, the real spectrum sequence corresponding to the second text sequence and the analog spectrum sequence corresponding to the second text sequence can be understood as training samples for the adversarial loss function model.

In the embodiment of the present application, since the adversarial loss function model is a deep learning model based on the generative adversarial networks and can learn by itself based on the generative adversarial networks by means of a large number of sample data of real spectrum sequences and analog spectrum sequences corresponding to the same text sequence, the loss function represented by it can more accurately reflect the essence of the spectrum sequence as well as the difference between the real spectrum sequence and the analog spectrum sequence.

Optionally, training the adversarial loss function model based on the real spectrum sequence corresponding to the second text sequence and the analog spectrum sequence corresponding to the second text sequence includes: inputting the real spectrum sequence corresponding to the second text sequence and the analog spectrum sequence corresponding to the second text sequence into the adversarial loss function model separately to obtain a third loss value; and training the adversarial loss function model based on the third loss value, wherein the third loss value represents a loss of the analog spectrum sequence corresponding to the second text sequence relative to the real spectrum sequence corresponding to the second text sequence.

In the embodiment of the present application, the real spectrum sequence corresponding to the second text sequence and the analog spectrum sequence corresponding to the second text sequence, that is, the real spectrum sequence and the analog spectrum sequence of the same text sequence, can be input separately into the adversarial loss function model which can extract and analyze characteristics of the real spectrum sequence and the analog spectrum sequence separately.

A larger output value of the spectrum sequence means that the spectrum sequence is closer to the real spectrum sequence, and a smaller output value of the spectrum sequence means a larger difference between the spectrum sequence and the real spectrum sequence. For the output value, the third loss value can be calculated according to the loss function of the adversarial loss function model itself.

The above-mentioned embodiments of the present application have the following advantages or beneficial effects: by inputting the real spectrum sequence and the analog spectrum sequence of the same text sequence into the adversarial loss function model, the adversarial loss function model can compare and learn the difference between the characteristics of the real spectrum sequence and the analog spectrum sequence, so that the loss function represented by the adversarial loss function model can more accurately reflect the authenticity of the spectrum sequence.

It should be noted that the technical solution in this embodiment is also applicable to the embodiment shown in FIG. 1 and can achieve the same beneficial effects, and this will not be detailed here in order to avoid repetition.

In step S304, the analog spectrum sequence corresponding to the first text sequence is input into the trained adversarial loss function model to obtain a second loss value.

After training the adversarial loss function model in step S303, the parameters of the adversarial loss function model are updated, and at this moment, the adversarial loss function model will be closer to an expected loss function than the adversarial loss function model at initialization.

In this step, the analog spectrum sequence corresponding to the first text sequence is input to the trained adversarial loss function model, and the obtained second loss value is fed back together with the first loss value to the speech spectrum generation model to enable the speech spectrum generation model to be trained again based on a new loss value, so that the parameters of the speech spectrum generation model will be further optimized.

Optionally, inputting the analog spectrum sequence corresponding to the first text sequence into the trained adversarial loss function model to obtain the second loss value includes: inputting the analog spectrum sequence corresponding to the first text sequence into the adversarial loss function model to obtain an original loss value; downsampling the analog spectrum sequence corresponding to the first text sequence N times to obtain each down-sampled analog spectrum sequence; inputting each down-sampled analog spectrum sequence into the adversarial loss function model separately to obtain a loss value corresponding to said down-sampled analog spectrum sequence; and obtaining the second loss value based on the loss values corresponding to all the down-sampled analog spectrum sequences and the original loss value.

Due to the multimode of the spectrum sequence, it is necessary to extract and analyze its characteristics from multiple perspectives and on multiple scales. In the embodiment of the present application, the adversarial loss function model can down-sample the spectrum sequence input therein several times, and each down-sampled spectrum sequence is input into the adversarial loss function model separately to extract and analyze its characteristics for discrimination.

Figure 4:
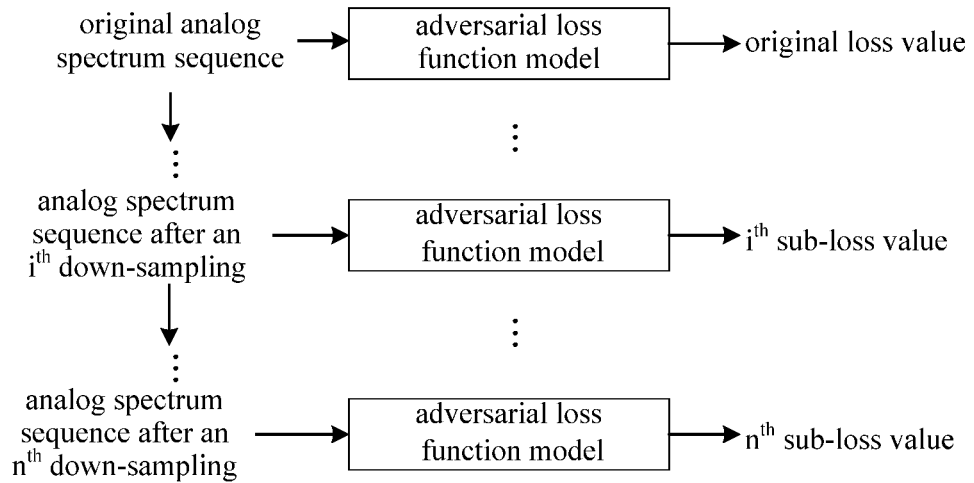
FIG. 4 is a schematic diagram of down-sampling a spectrum sequence by an adversarial loss function model according to the second embodiment of the present application.

Specifically, as shown in FIG. 4, the original analog spectrum sequence corresponding to the first text sequence is first down-sampled n times and each down-sampled spectrum sequence is obtained; thereafter, each down-sampled spectrum sequence is input into the adversarial loss function model separately for characteristic extraction and analysis, and an original loss value can be output corresponding to the original analog spectrum sequence, and a sub-loss value can be output corresponding to each down-sampled spectrum sequence.

The loss values corresponding to the down-sampled spectrum sequences need to be fed back to the adversarial loss function model. Specifically, an $i^{th}$ sub-loss value corresponding to an $i^{th}$ down-sampled spectrum sequence is fed back to the adversarial loss function model, and thus to the $i^{th}$ down-sampled spectrum sequence. Thereafter, the sub-loss value corresponding to each down-sampling is returned to the original analog spectrum sequence layer by layer to obtain the second loss value.

In this way, the adversarial loss function model can extract and analyze the characteristics of the input spectrum on different scales, and achieve the function of determining the authenticity of the spectrum in a high-dimensional space.

In one embodiment, the down-sampling of the analog spectrum sequence corresponding to the first text sequence can be implemented as follows: assuming that the analog spectrum sequence corresponding to the first text sequence can be expressed as a characteristic matrix of 100 frames×80 dimensions, data of two adjacent frames can be averaged so that the characteristic matrix can be down-sampled into a characteristic matrix of 50 frames×80 dimensions, and so on. It can be understood that the implementation of the down-sampling is not limited thereto, and it is not particularly defined in the embodiment of the present application.

It should be noted that when training the adversarial loss function model by using the real spectrum sequence and analog spectrum sequence of the same text sequence, the real spectrum sequence and the analog spectrum sequence input into the adversarial loss function model can be each down-sampled several times as described above so as to train a characteristic extraction capability and a discriminating power of the adversarial loss function model on multiple scales.

The above-mentioned embodiments of the present application have the following advantages or beneficial effects: after inputting the analog spectrum sequence corresponding to the first text sequence into the adversarial loss function model, the adversarial loss function model can down-sample the spectrum sequence several times and extract and analyze the characteristics of the input spectrum on different scales, so that the adversarial loss function can more accurately determine the authenticity of the spectrum sequence.

It should be noted that the technical solution in this embodiment is also applicable to the embodiment shown in FIG. 1 and can achieve the same beneficial effects, and this will not be detailed here in order to avoid repetition.

Optionally, the adversarial loss function model adopts a deep convolutional neural network model.

Figure 5:
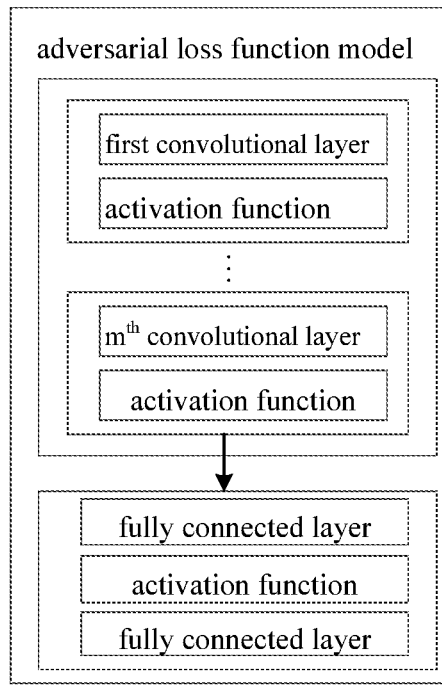
FIG. 5 is a schematic diagram showing a structure of the adversarial loss function model according to the second embodiment of the present application.

In the embodiment of the present application, as shown in FIG. 5, the adversarial loss function model adopts a multi-layered deep convolutional neural network model, in which the characteristics of the spectrum sequence can be extracted from multiple perspectives through a plurality of convolutional layers. For example, only some low-level characteristics such as edges, lines and corners can be extracted through a first convolutional layer, and more complicated characteristics can be iteratively extracted from low-level characteristics through a plurality of layers of networks, and when the spectrum is abstracted through convolutional neural networks, context information of the spectrum sequence can be retained, so that the characteristic extraction is more comprehensive and accurate. The number of convolutional layers can be determined as required, and it is not particularly limited in the embodiment of the present application.

In step S305, the speech spectrum generation model is trained based on the first loss value and the second loss value.

Reference can be made to the specific description of S103 in the embodiment shown in FIG. 1 for a specific implementation of this step S305, which will not be described in detail here in order to avoid repetition.

In the embodiment of the present application, the speech spectrum generation model and the adversarial loss function model are alternately and cyclically trained, which can be understood as steps S401 to S403.

In step S401, when the speech spectrum generation model is in a state of initialization, parameters can be initialized randomly, and a corresponding analog spectrum sequence is generated according to a second text sequence that is input.

In step S402, the analog spectrum sequence corresponding to the second text sequence as generated above and the real spectrum sequence corresponding to the second text sequence are input into the initialized adversarial loss function model to train the adversarial loss function model once.

In step S403, the first text sequence is input into the initialized speech spectrum generation model to generate an analog spectrum sequence corresponding to the first text sequence, and the trained adversarial loss function is used as the loss function of the speech spectrum generation model to train the speech spectrum generation model once in combination with the preset loss function. At this point, it is a training cycle.

Thereafter, the steps S402 to S403 are repeated by using the analog spectrum sequence generated by the trained speech spectrum generation model, so that the speech spectrum generation model and the adversarial loss function model are sequentially and alternately trained.

In the embodiment of the present application, the speech spectrum generation model and the adversarial loss function model can be alternately and cyclically trained. In the process of their mutual adversarial learning and training, the adversarial loss function model gradually approaches an expected loss function, and the spectrum sequence generated by the speech spectrum generation model thus gradually approaches the real spectrum sequence.

A graphic data processing method in the embodiment of the present application has added many optional implementations on the basis of the embodiment shown in FIG. 1, each of which can further make the generated spectrum sequence clearer.

The present application further provides an apparatus for training a speech spectrum generation model.

Figure 6:
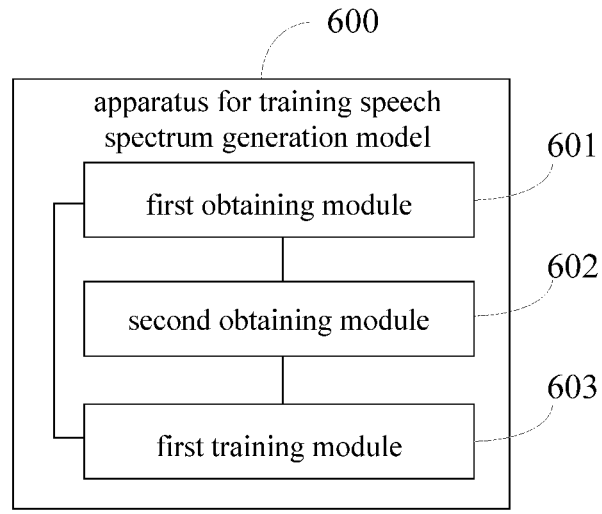
FIG. 6 is a first block diagram of an apparatus for training a speech spectrum generation model according to a third embodiment of the present application.

As shown in FIG. 6, the apparatus 600 for training the speech spectrum generation model includes: a first obtaining module 601 configured to input a first text sequence into the speech spectrum generation model to generate an analog spectrum sequence corresponding to the first text sequence, and obtain a first loss value of the analog spectrum sequence according to a preset loss function; a second obtaining module 602 configured to input the analog spectrum sequence corresponding to the first text sequence into an adversarial loss function model, which is a generative adversarial network model, to obtain a second loss value of the analog spectrum sequence; and a first training module 603, configured to train the speech spectrum generation model based on the first loss value and the second loss value.

Figure 7:
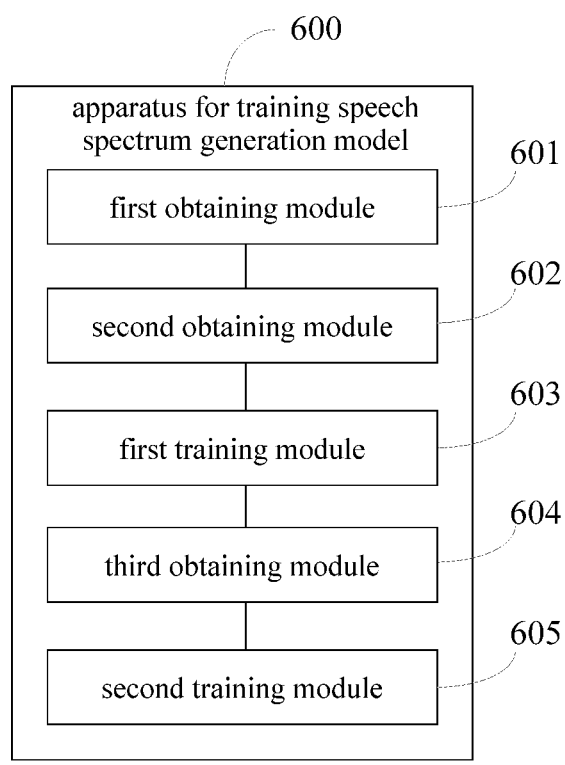
FIG. 7 is a second block diagram of the apparatus for training the speech spectrum generation model according to the third embodiment of the present application.

Optionally, as shown in FIG. 7, the apparatus 600 for training the speech spectrum generation model further includes a third obtaining module 604 configured to obtain a real spectrum sequence corresponding to a second text sequence, and an analog spectrum sequence corresponding to the second text sequence, which is generated by the speech spectrum generation model, and a second training module 605 configured to train the adversarial loss function model based on the real spectrum sequence corresponding to the second text sequence and the analog spectrum sequence corresponding to the second text sequence.

The second obtaining module 602 is specifically configured to input the analog spectrum sequence corresponding to the first text sequence into the trained adversarial loss function model to obtain the second loss value.

Optionally, the second training module 605 includes a first obtaining unit configured to input the real spectrum sequence corresponding to the second text sequence and the analog spectrum sequence corresponding to the second text sequence into the adversarial loss function model separately to obtain a third loss value, and a training unit configured to train the adversarial loss function model based on the third loss value, wherein the third loss value represents a loss of the analog spectrum sequence corresponding to the second text sequence relative to the real spectrum sequence corresponding to the second text sequence.

Optionally, the second obtaining module 602 includes a second obtaining unit configured to input the analog spectrum sequence corresponding to the first text sequence into the adversarial loss function model to obtain an original loss value, a down-sampling unit configured to down-sample the analog spectrum sequence corresponding to the first text sequence N times to obtain each down-sampled analog spectrum sequence, a third obtaining unit configured to input each down-sampled analog spectrum sequence into the adversarial loss function model separately to obtain a loss value corresponding to said down-sampled analog spectrum sequence, and a fourth obtaining unit configured to obtain the second loss value based on the loss values corresponding to all the down-sampled analog spectrum sequences and the original loss value.

Optionally, the adversarial loss function model adopts a deep convolutional neural network model.

In the above-mentioned embodiments of the present application, the apparatus 600 for training the speech spectrum generation model can implement the various processes implemented in the method embodiments as shown in FIGS. 1 and 3, and can achieve the same beneficial effects, and this will not be detailed here in order to avoid repetition.

According to the embodiments of the application, the present application further provides an electronic device and a readable storage medium.

Figure 8:
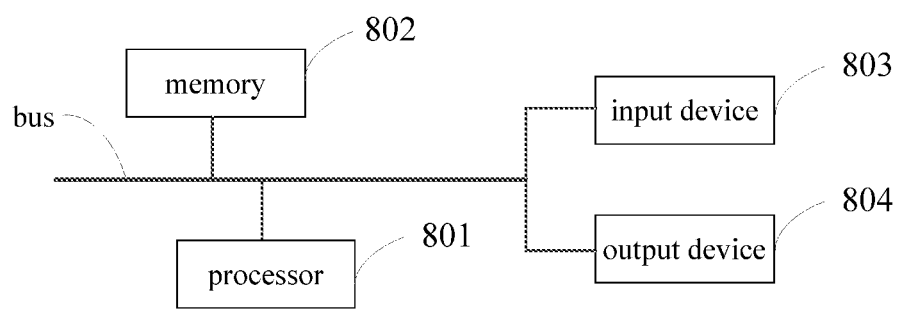
FIG. 8 is a diagram showing a scene in which the method for training the speech spectrum generation model of the embodiment of the present application can be implemented.

As shown in FIG. 8, it is a block diagram of electronic devices for a method for training a speech spectrum generation model according to an embodiment of the present application. The electronic devices are intended to represent various forms of digital computers, such as laptop computers, desktop computers, platforms, personal digital assistants, servers, blade servers, mainframe computers, or other suitable computers. The electronic devices can also represent various forms of mobile devices, such as personal digital assistants, cellular phones, smart phones, wearable devices, and other similar computing devices. The components, their connections and relationships as well as their functions shown herein are merely examples, and are not intended to limit the implementation of the present application described and/or claimed herein.

As shown in FIG. 8, the electronic devices include one or more processors 801, a memory 802, and interfaces for connecting various components, including high-speed interfaces and low-speed interfaces. The various components are connected to each other via different buses, and can be mounted on a common mainboard, or mounted in another manner as required. The processor can process instructions that are executed in the electronic devices, including instructions stored in or on the memory to display graphical information of the GUI on an external input/output device, such as a display device coupled to the interface. In other embodiments, multiple processors and/or multiple buses may be used with multiple memories, if necessary. Similarly, multiple electronic devices can be connected, each providing some necessary operations (for example, serving as a server array, a group of blade servers, or a multi-processor system). One processor 801 is shown as an example in FIG. 8.

The memory 802 is a non-transitory computer-readable storage medium provided by the present application. The memory has stored thereon instructions that are executable by at least one processor so that the at least one processor executes the method for training the speech spectrum generation model provided in the present application. The non-transitory computer-readable storage medium of the present application has stored thereon computer instructions, which are used to cause the computer to execute the method for training the speech spectrum generation model provided by the present application.

As a non-transitory computer-readable storage medium, the memory 802 can be used to store non-transitory software programs, non-transitory computer executable programs, and modules, such as program instructions/modules corresponding to the method for training the speech spectrum generation model in the embodiment of the present application, for example, the first obtaining module 601, the second obtaining module 602, and the first training module 603 as shown in FIG. 6. The processor 801 executes various functional applications of the server and data processing by running the non-transient software programs, instructions and modules stored in the memory 802. That is, it realizes the method for training the speech spectrum generation model in the foregoing method embodiments.

The memory 802 can include a program storage area, which can store an operating system and an application required by at least one function, and a data storage area, which can store data created according to the use of the electronic devices for the method for training the speech spectrum generation model, or the like. In addition, the memory 802 may include a high-speed random access memory, and may also include a non-transitory memory, such as at least one magnetic disk storage device, flash memory devices, or other non-transitory solid-state storage devices. In some embodiments, the memory 802 may optionally include storages that are remotely located from the processor 801, and these remote storages may be connected to the electronic devices for the method for training the speech spectrum generation model via a network. Examples of the aforementioned network include, but are not limited to, internets, corporate intranets, local area networks, mobile communication networks, and combinations thereof.

The electronic devices for the method for training the speech spectrum generation model may further include an input device 803 and an output device 804. The processor 801, the memory 802, the input device 803, and the output device 804 may be connected via buses or in other ways. The connections via buses are shown as an example in FIG. 8.

The input device 803 can receive input digital or character information, and generate key signal inputs related to user settings and function control of the electronic devices for the method for training the speech spectrum generation model, and may be, for example, a touch screen, a keypad, a mouse, a trackpad, a touchpad, a pointing stick, one or more mouse buttons, a trackball or a joystick. The output device 804 may include a display device, an auxiliary lighting device such as a light-emitting diode (LED), and a tactile feedback device such as a vibration motor. The display device may include, but is not limited to, a liquid crystal display (LCD), a light-emitting diode (LED) display, and a plasma display. In some embodiments, the display device may be a touch screen.

Various implementations of the systems and techniques described herein can be implemented in a digital electronic circuit system, an integrated circuit system, an application specific integrated circuit (ASIC), computer hardware, firmware, software, and/or a combination thereof. These various implementations may include implementation in one or more computer programs, which may be executed and/or interpreted on a programmable system including at least one programmable processor. The programmable processor can be a dedicated or general-purpose programmable processor that can receive data and instructions from, and transmit data and instructions to, a storage system, at least one input device, and at least one output device.

These computer programs (also called programs, software, software applications, or codes) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives a machine-readable signal. The term "machine-readable signal" refers to any signal to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. The server can be a cloud server, also known as a cloud computing server or a cloud host, which is a host product in the cloud computing service system to solve defects of difficult management and weak business scalability existing in traditional physical host and VPS ("Virtual Private Server", or "VPS" for short) service.

According to the technical solution of the embodiment of the present application, the first text sequence is input into the speech spectrum generation model to generate the analog spectrum sequence corresponding to the first text sequence, and obtain the first loss value of the analog spectrum sequence according to the preset loss function; the analog spectrum sequence corresponding to the first text sequence is input into the adversarial loss function model to obtain the second loss value of the analog spectrum sequence; and the speech spectrum generation model is trained based on the first loss value and the second loss value. The adversarial loss function model learns a loss function based on the generative adversarial networks, and the speech spectrum generation model is trained by the adversarial loss function together with the preset loss function, which can make the spectrum sequence generated by the speech spectrum generation model clearer and closer to the distribution of the real spectrum sequence, thereby improving the stability in subsequent audio conversion and improving the tone quality of the finally synthesized audio.

It should be understood that the steps can be reordered, added or deleted on the basis of the various forms of processes shown above. For example, the steps described in the present application can be executed in parallel, sequentially, or in a different order, so long as the desired result of the technical solution disclosed in the present application can be achieved, and this is not limited herein.

The above specific implementations do not constitute a limitation on the scope of protection of the present application. Those skilled in the art should understand that various modifications, combinations, sub-combinations, and substitutions can be made according to design requirements and other factors. Any modifications, equivalent substitutions and improvements made within the spirit and principles of the present application shall be included in the scope of protection of the present application.

What is claimed is:

1. A method for training a speech spectrum generation model, the method comprising:
   inputting a first text sequence as a real spectrum sequence into the speech spectrum generation model to generate an analog spectrum sequence corresponding to the first text sequence, and to obtain a first loss value of the analog spectrum sequence according to a preset loss function, wherein the first loss value represents a loss in terms of intelligibility of the analog spectrum sequence relative to the real spectrum sequence;
   inputting the analog spectrum sequence corresponding to the first text sequence into an adversarial loss function model, which is a generative adversarial network model, to obtain a second loss value of the analog spectrum sequence, wherein the second loss value represents a loss in terms of clarity of the analog spectrum sequence relative to the real spectrum sequence; and
   feeding the first loss value and the second loss value back to the speech spectrum generation model according to a preset ratio that is determined depending on characterisitics of speakers in different sound banks, and training the speech spectrum generation model based on the first loss value and the second loss value fed back.

2. The method according to claim 1, wherein prior to inputting the analog spectrum sequence corresponding to the first text sequence into the adversarial loss function model to obtain the second loss value of the analog spectrum sequence, the method further comprises:
   obtaining a real spectrum sequence corresponding to a second text sequence, and an analog spectrum sequence corresponding to the second text sequence, which is generated by the speech spectrum generation model; and
   training the adversarial loss function model based on the real spectrum sequence corresponding to the second text sequence and the analog spectrum sequence corresponding to the second text sequence, and
   wherein inputting the analog spectrum sequence corresponding to the first text sequence into the adversarial loss function model to obtain the second loss value of the analog spectrum sequence comprises inputting the analog spectrum sequence corresponding to the first text sequence into the trained adversarial loss function model to obtain the second loss value.

3. The method according to claim 2, wherein training the adversarial loss function model based on the real spectrum sequence corresponding to the second text sequence and the analog spectrum sequence corresponding to the second text sequence comprises:
   inputting the real spectrum sequence corresponding to the second text sequence and the analog spectrum sequence corresponding to the second text sequence into the adversarial loss function model separately to obtain a third loss value; and
   training the adversarial loss function model based on the third loss value,
   wherein the third loss value represents a loss of the analog spectrum sequence corresponding to the second text sequence relative to the real spectrum sequence corresponding to the second text sequence.

4. The method according to claim 1, wherein inputting the analog spectrum sequence corresponding to the first text sequence into the adversarial loss function model to obtain the second loss value of the analog spectrum sequence comprises:
   inputting the analog spectrum sequence corresponding to the first text sequence into the adversarial loss function model to obtain an original loss value;
   down-sampling the analog spectrum sequence corresponding to the first text sequence N times to obtain each down-sampled analog spectrum sequence;
   inputting each down-sampled analog spectrum sequence into the adversarial loss function model separately to obtain a loss value corresponding to said down-sampled analog spectrum sequence; and
   obtaining the second loss value based on the loss values corresponding to all of the down-sampled analog spectrum sequences and the original loss value.

5. The method according to claim 1, wherein the adversarial loss function model adopts a deep convolutional neural network model.

6. The method according to claim 1, wherein the speech spectrum generation model comprises a Tacotron model.

7. The method according to claim 1, wherein the speech spectrum generation model comprises a Text To Speech (TTS) model.

8. An electronic device, comprising:
   at least one processor; and
   a memory communicatively coupled to the at least one processor,
   wherein the memory stores instructions executable by the at least one processor, which are executed by the at least one processor to enable the at least one processor to perform a method for training a speech spectrum generation model, the method comprising:
   inputting a first text sequence as a real spectrum sequence into the speech spectrum generation model to generate an analog spectrum sequence corresponding to the first text sequence, and to obtain a first loss value of the analog spectrum sequence according to a preset loss function, wherein the first loss value represents a loss in terms of intelligibility of the analog spectrum sequence relative to the real spectrum sequence;
   inputting the analog spectrum sequence corresponding to the first text sequence into an adversarial loss function model, which is a generative adversarial network model, to obtain a second loss value of the analog spectrum sequence, wherein the second loss value represents a loss in terms of clarity of the analog spectrum sequence relative to the real spectrum sequence; and
   feeding the first loss value and the second loss value back to the speech spectrum generation model according to a preset ratio that is determined depending on characterisitics of speakers in different sound banks, and training the speech spectrum generation model based on the first loss value and the second loss value fed back.

9. The electronic device according to claim 8, wherein prior to inputting the analog spectrum sequence corresponding to the first text sequence into the adversarial loss function model to obtain the second loss value of the analog spectrum sequence, the method further comprises:
   obtaining a real spectrum sequence corresponding to a second text sequence, and an analog spectrum sequence corresponding to the second text sequence, which is generated by the speech spectrum generation model; and training the adversarial loss function model based on the real spectrum sequence corresponding to the second text sequence and the analog spectrum sequence corresponding to the second text sequence, and wherein inputting the analog spectrum sequence corresponding to the first text sequence into the adversarial loss function model to obtain the second loss value of the analog spectrum sequence comprises inputting the analog spectrum sequence corresponding to the first text sequence into the trained adversarial loss function model to obtain the second loss value.

10. The electronic device according to claim 9, wherein training the adversarial loss function model based on the real spectrum sequence corresponding to the second text sequence and the analog spectrum sequence corresponding to the second text sequence comprises:

inputting the real spectrum sequence corresponding to the second text sequence and the analog spectrum sequence corresponding to the second text sequence into the adversarial loss function model separately to obtain a third loss value; and training the adversarial loss function model based on the third loss value, wherein the third loss value represents a loss of the analog spectrum sequence corresponding to the second text sequence relative to the real spectrum sequence corresponding to the second text sequence.

11. The electronic device according to claim 8, wherein inputting the analog spectrum sequence corresponding to the first text sequence into the adversarial loss function model to obtain the second loss value of the analog spectrum sequence comprises:

inputting the analog spectrum sequence corresponding to the first text sequence into the adversarial loss function model to obtain an original loss value;

down-sampling the analog spectrum sequence corresponding to the first text sequence N times to obtain each down-sampled analog spectrum sequence;

inputting each down-sampled analog spectrum sequence into the adversarial loss function model separately to obtain a loss value corresponding to said down-sampled analog spectrum sequence; and obtaining the second loss value based on the loss values corresponding to all of the down-sampled analog spectrum sequences and the original loss value.

12. The electronic device according to claim 8, wherein the adversarial loss function model adopts a deep convolutional neural network model.

13. The electronic device according to claim 8, wherein the speech spectrum generation model comprises a Tacotron model.

14. The electronic device according to claim 8, wherein the speech spectrum generation model comprises a Text To Speech (TTS) model.

15. A non-transitory computer-readable storage medium having computer instructions stored thereon, which are used to realize a method for training a speech spectrum generation model, the method comprising:

inputting a first text sequence as a real spectrum sequence into the speech spectrum generation model to generate an analog spectrum sequence corresponding to the first text sequence, and to obtain a first loss value of the analog spectrum sequence according to a preset loss function, wherein the first loss value represents a loss in terms of intelligibility of the analog spectrum sequence relative to the real spectrum sequence;

inputting the analog spectrum sequence corresponding to the first text sequence into an adversarial loss function model, which is a generative adversarial network model, to obtain a second loss value of the analog spectrum sequence, wherein the second loss value represents a loss in terms of clarity of the analog spectrum sequence relative to the real spectrum sequence; and feeding the first loss value and the second loss value back to the speech spectrum generation model according to a preset ratio that is determined depending on characterisitics of speakers in different sound banks, and training the speech spectrum generation model based on the first loss value and the second loss value fed back.

16. The non-transitory computer-readable storage medium according to claim 15, wherein prior to inputting the analog spectrum sequence corresponding to the first text sequence into the adversarial loss function model to obtain the second loss value of the analog spectrum sequence, the method further comprises:

obtaining a real spectrum sequence corresponding to a second text sequence, and an analog spectrum sequence corresponding to the second text sequence, which is generated by the speech spectrum generation model; and training the adversarial loss function model based on the real spectrum sequence corresponding to the second text sequence and the analog spectrum sequence corresponding to the second text sequence, and wherein inputting the analog spectrum sequence corresponding to the first text sequence into the adversarial loss function model to obtain the second loss value of the analog spectrum sequence comprises inputting the analog spectrum sequence corresponding to the first text sequence into the trained adversarial loss function model to obtain the second loss value.

17. The non-transitory computer-readable storage medium according to claim 16, wherein training the adversarial loss function model based on the real spectrum sequence corresponding to the second text sequence and the analog spectrum sequence corresponding to the second text sequence comprises:

inputting the real spectrum sequence corresponding to the second text sequence and the analog spectrum sequence corresponding to the second text sequence into the adversarial loss function model separately to obtain a third loss value; and training the adversarial loss function model based on the third loss value, wherein the third loss value represents a loss of the analog spectrum sequence corresponding to the second text sequence relative to the real spectrum sequence corresponding to the second text sequence.

18. The non-transitory computer-readable storage medium according to claim 15, wherein inputting the analog spectrum sequence corresponding to the first text sequence into the adversarial loss function model to obtain the second loss value of the analog spectrum sequence comprises:

inputting the analog spectrum sequence corresponding to the first text sequence into the adversarial loss function model to obtain an original loss value;

down-sampling the analog spectrum sequence corresponding to the first text sequence N times to obtain each down-sampled analog spectrum sequence;

inputting each down-sampled analog spectrum sequence into the adversarial loss function model separately to obtain a loss value corresponding to said down-sampled analog spectrum sequence; and obtaining the second loss value based on the loss values corresponding to all of the down-sampled analog spectrum sequences and the original loss value.

19. The non-transitory computer-readable storage medium according to claim 15, wherein the adversarial loss function model adopts a deep convolutional neural network model.

20. The non-transitory computer-readable storage medium according to claim 15, wherein the speech spectrum generation model comprises a Tacotron model or a Text To Speech (TTS) model.

* * * * *